United States Patent [19]

Koegel

[11] Patent Number: 5,036,456
[45] Date of Patent: Jul. 30, 1991

[54] APPARATUS FOR CONTROLLING CONCURRENT OPERATIONS OF A SYSTEM CONTROL UNIT INCLUDING ACTIVITY REGISTER CIRCUITRY

[75] Inventor: Robert J. Koegel, Glendale, Ariz.

[73] Assignee: Honeywell Information Systems Inc., Phoenix, Ariz.

[21] Appl. No.: 409,982

[22] Filed: Sep. 19, 1989

Related U.S. Application Data

[63] Continuation of Ser. No. 14,554, Feb. 13, 1987, abandoned.

[51] Int. Cl.⁵ .............................................. G06F 13/14
[52] U.S. Cl. ................................... 364/200; 364/281.4
[58] Field of Search ... 364/900 MS File, 200 MS File

[56] References Cited

U.S. PATENT DOCUMENTS

| | | | |
|---|---|---|---|
| 4,080,649 | 3/1978 | Calle | 364/200 |
| 4,413,317 | 11/1983 | Swenson | 364/200 |
| 4,425,615 | 1/1984 | Swenson et al. | 364/200 |
| 4,564,899 | 1/1986 | Holly et al. | 364/200 |

Primary Examiner—Lawrence E. Anderson
Attorney, Agent, or Firm—James H. Phillips; J. S. Solakian

[57] ABSTRACT

In a data processing system having a system controller unit (SCU) which interfaces a plurality of equipments with a memory unit, the SCU determines which of the equipments will be permitted to communicate with the SCU or memory unit in response to a request from the equipments. The SCU includes an activity monitor and control apparatus which determines whether the request from the equipments can be accepted. The activity monitor and control apparatus comprises a plurality of first elements, each of the first elements being assigned to monitor a request which has been accepted. The activity monitor and control apparatus monitors the operations with the SCU thereby providing status information of the SCU. A plurality of second elements, which is operatively connected to the first elements, combines preselected status information to generate control signals thereby indicating current and future availability of the SCU in order to determine whether a request can be accepted.

6 Claims, 8 Drawing Sheets

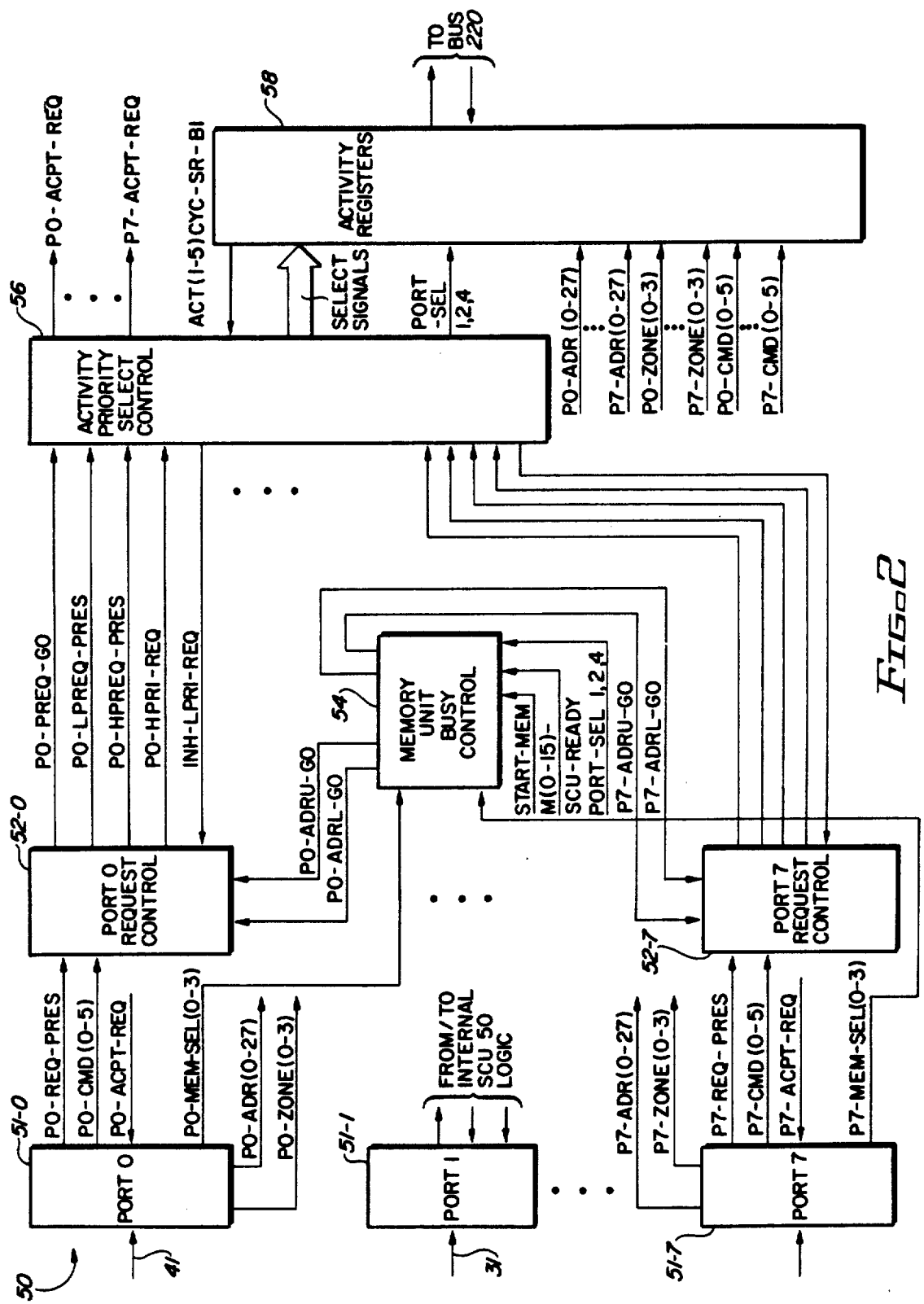

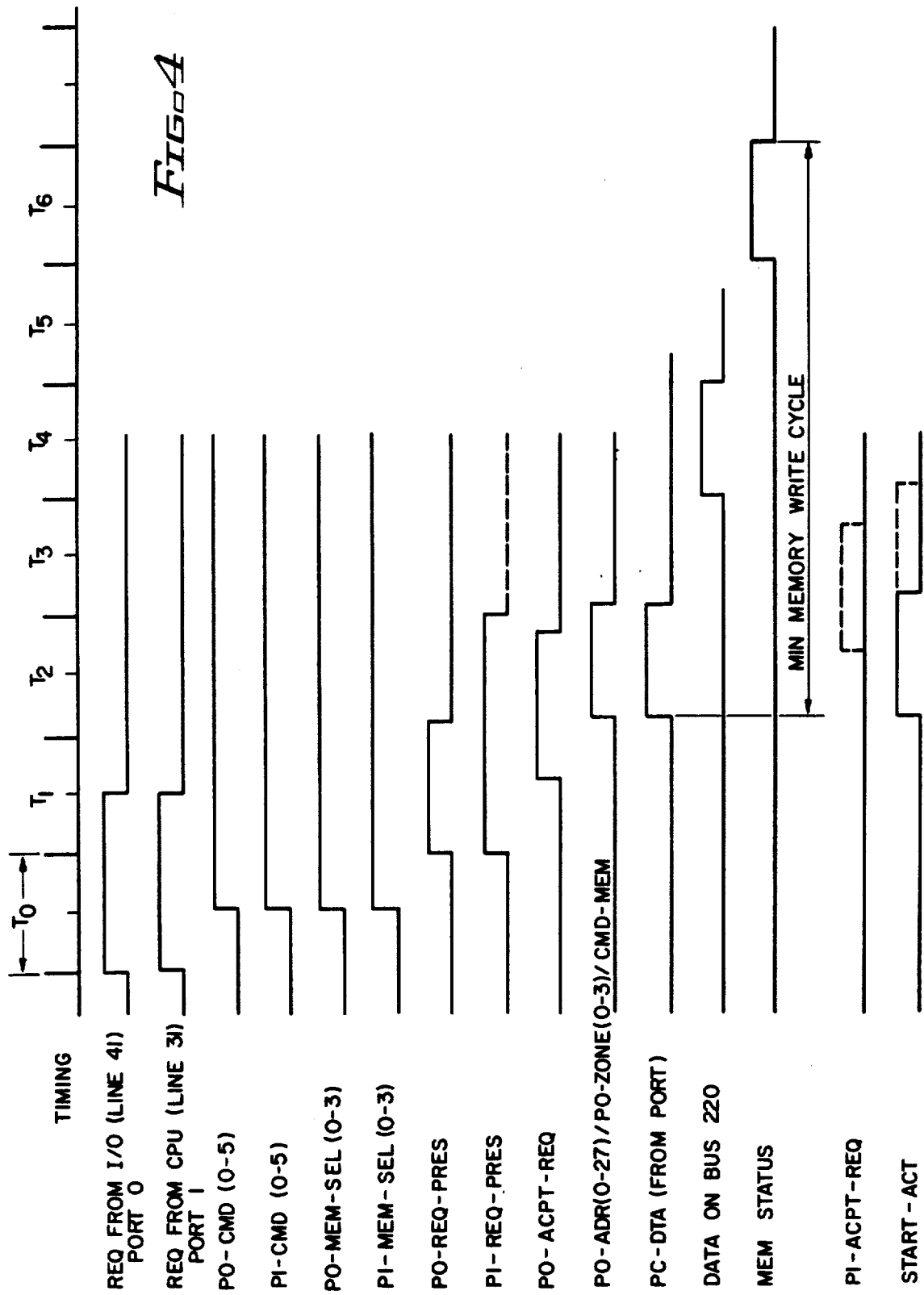

APPARATUS FOR CONTROLLING CONCURRENT OPERATIONS OF A SYSTEM CONTROL UNIT INCLUDING ACTIVITY REGISTER CIRCUITRY

This is a continuation of copending application Ser. No. 07/014,554 filed on Feb. 13, 1987, now abandoned.

The present invention may be employed in a data processing system, and more particularly may be employed in a system control unit such as that disclosed in U.S. patent application Ser. No. 902,545, now U.S. Pat. No. 4,821,177, filed Sept. 2, 1986, entitled "Apparatus for Controlling System Accesses Having Multiple Command Level Conditional Rotational Multiple Port Servicing Priority Hierarchy", the application being assigned to Honeywell Information Systems Inc., the assignee of the present application.

BACKGROUND OF THE INVENTION

This invention relates to a control apparatus, and more particularly, to a control apparatus for determining the availability of data flow registers, buses, and switches within a system control unit of a data processing apparatus in order to initiate and control an activity.

The present invention utilizes relatively simple individual blocks of logic in a novel configuration for achieving the monitoring and controlling of the many activities of the system control unit by repeating the blocks of logic for the number of simultaneous activities desired. The blocks of logic of the preferred embodiment of the present invention include the novel configuration of shift registers for real time monitor and control of activities.

SUMMARY OF THE INVENTION

Therefore, there is provided by the present invention, an apparatus for controlling and monitoring the simultaneous operations of a system controller. In a data processing system having a system controller unit (SCU) which interfaces a plurality of equipments with a memory unit, the SCU determines which of the equipments will be permitted to communicate with the SCU or memory unit in response to a request from the equipments. The SCU includes an activity monitor and control apparatus which determines whether the request from the equipments can be accepted. The activity monitor and control apparatus comprises a plurality of first elements, each of the first elements being assigned to monitor a request which has been accepted. The activity monitor and control apparatus monitors the operations with the SCU thereby providing status information of the SCU. A plurality of second elements, which is operatively connected to the first elements, combines preselected status information to generate control signals, thereby indicating current and future availability of the SCU in order to determine whether a request can be accepted.

In the preferred embodiment of the present invention the first elements comprise a group of shift registers, each group of shift registers being associated with a request (i.e., an activity, which is a command associated with the request). The activity shift registers are used to indicate the length of the cycle of the activity, the data-in, and the data-out utilization of the SCU. Each bit position of the data-in and data-out control shift registers reflects a utilization of some logic within the SCU at some future point in time. Thus if a bit is set in a predetermined position of one of the data control shift registers which indicates utilization of a block of logic within the SCU, and if the request from an equipment under consideration requires the same block of logic in order to execute the requested command, a conflict will arise, and thus the request should not be accepted. In the preferred embodiment of the present invention, corresponding bit positions of the data-in and data-out control shift registers for each activity are combined in or-gates in order to insure the availability of the logic required to execute the requested command at the future point in time. Each clock cycle, as the steps of the operation are executed by the SCU, the shift registers shift one position. When the request is accepted, the selected activity shift registers are loaded with a predetermined bit pattern which reflects the utilization of the various blocks of logic within the SCU (or the memory unit) at a future point in time.

Accordingly, it is an object of the present invention to provide an apparatus for monitoring and controlling a predetermined number of simultaneous activities.

It is another object of the present invention to provide an apparatus for real time monitoring and controlling a predetermined number of simultaneous activities.

It is still another object of the present invention to provide an apparatus for real time monitoring and controlling a predetermined number of simultaneous activities within a control unit.

It is still a further object of the present invention to provide an apparatus for real time monitoring and controlling a predetermined number of simultaneous activities within a control unit to determine the availability of logic within the control unit in order to initiate and control the activity.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 2 shows a functional block diagram of the system control unit of the preferred embodiment;

FIG. 4 shows a timing diagram of simultaneous requests from two different ports;

FIG. 6, shows a functional block diagram of the activity registers of the preferred embodiment of the present invention;

FIG. 7 shows a timing diagram of the select signals for loading the activity register for a predetermined command; and .

DETAILED DESCRIPTION

Before describing the apparatus of the present invention, it will be beneficial in understanding the present invention to briefly describe the system in which the present invention can be applied.

Figure 1:
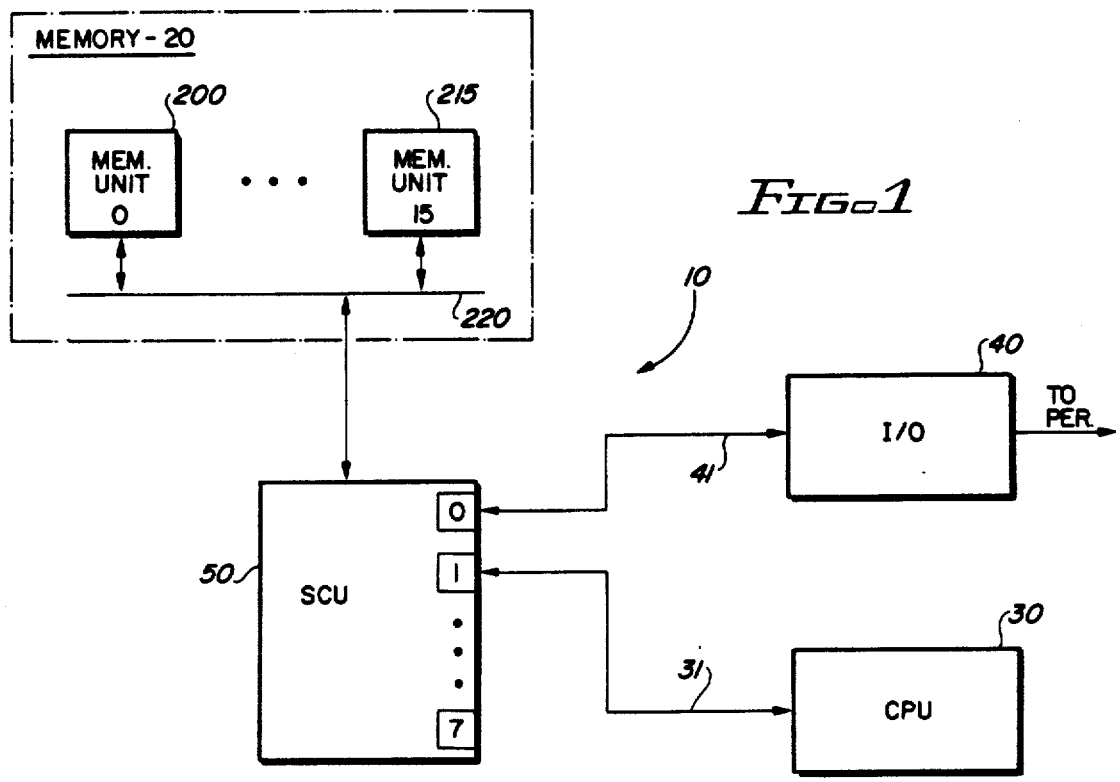
FIG. 1 shows a data processing system which includes a system control unit in which the activity monitor and control apparatus of the present invention may be found.

Referring to FIG. 1, there is shown a data processing system (DPS) 10, including a system control unit (SCU) 50 which incorporates the activity monitor and control apparatus of the present invention. In the DPS 10, there is included a memory 20, a central processing unit (CPU) 30, and an input/output I/O unit 40 which in turn interfaces with a variety of peripherals (PER). The CPU 30 and the I/O unit 40 interface with the memory 20 via a system control unit (SCU) 50. The CPU 30 and the I/O unit 40 make requests for the memory 20 in order to perform predetermined tasks of the DPS 10. The SCU 50 determines whether the CPU 30 or I/O unit 40 will gain access to the memory 20 when simultaneous, or near simultaneous, requests are made. In order to resolve conflicts in the request for access to the memory 20 (or for access to internal SCU registers), logic of the SCU 50 includes a priority scheme such that high priority requests will be granted first. Generally, the CPU 30 can afford to wait a small period of time before being granted access to the memory 20. In some cases, when the I/O unit 40 is interfacing with a device such as a disk file, the I/O unit 40 can not afford to wait due to the nature of the I/O (i.e., data transfer) occurring between the I/O unit 40 and the disk file. In some cases, the I/O unit 40 is interfacing with a peripheral which does not require fast accesses to the memory 20, in which case the I/O unit can then afford to wait. As a result, various type commands, such as high and low priority commands, are incorporated into the DPS 10, the commands being issued by the equipments (i.e., the CPU 30 or the I/O unit 40 of the preferred embodiment of the DPS 1), to help insure a proper decision is made by the SCU 50 in granting access to the memory 20. The granting of requests in accordance with the priority scheme is more fully described in the above-mentioned related patent application. The SCU 50 includes a plurality of ports, in the preferred embodiment the SCU 50 including ports 0-7, having an initial priority based on port number within a command level. As a result of servicing a request from the I/O unit 40 or the CPU 30, or any additional equipments which may be connected to a corresponding port, the priority within a command level may be rotated in order to avoid a lower priority port being blocked. Further, the rotation of the priorities is conditional upon there not being a higher priority request pending within a command level which has not been responded to. This further insures that a higher priority request will not be indefinitely passed over.

The memory 20 of the preferred embodiment includes sixteen memory units, memory unit 0 200 through memory unit 15 215, each memory unit 0-15 being connected to a bus 220, the bus 220 including an input bus and an output bus (not shown), the SCU 50 also being connected to the bus 220.

Between the SCU 50 and the CPU 30, and between the SCU 50 and the I/O unit 40, there exists an I/O protocol for the exchange of data via interconnecting lines 31, 41, respectively. When either the CPU 30 or the I/O unit 40 desires to access the memory 20, a request signal is set on the respective interconnecting lines 31', 41' these lines being part of the interconnecting lines 31, 41 shown. It is to be understood that interconnecting lines 31, 41, as well as bus 220 include data lines, address lines, and command and control lines. In addition, a signal indicating the command, and a signal indicating the memory location is set o respective interconnecting lines 31'', 41'' by the requestor (i.e., the CPU 30 or the I/O unit 40). The logic of the SCU 50 determines whether or not to accept the request signal from the CPU 30 or the I/O unit 40. If predetermined conditions are satisfied (e.g., memory is available, ... ), the request is accepted in accordance with the priority hierarchy of the logic of the SCU 50, and an accept signal is transmitted from the SCU 50 to the port, and in turn from the port to the CPU 30 or the I/O unit 40, allowing the data transfer between the port and the CPU 30 or the I/O unit 40 to take place in accordance with the established protocol. Of interest here is the logic of the SCU 50 for accepting the request from the CPU 30 or the I/O unit 40, as determined by the activity monitor and control apparatus of the present invention, and will be discussed in detail hereinunder. The transfer of data, once the SCU 50 has accepted the CPU 30 or I/O unit 40 for data transfer, is in accordance with the established protocol and is not relevant to the discussion of the present invention and will not be discussed further herein.

Referring to FIG. 2, there is shown a functional block diagram of the SCU 50. The SCU 50 of the preferred embodiment comprises eight ports, port 0-port 7, 51-0 through 51-7, each port being connected to a respective equipment. In the preferred embodiment, port 0 51-0 is connected to I/O unit 40 (not shown) via interconnect line 41, and port 1 51-1 is connected to CPU 30 (not shown) via interconnect line 31. In the preferred embodiment, the remaining ports, port 2-port 7 (51-2-51-7), are not coupled to any equipment. Each port, 51-0-51-7, is connected to a respective port request control, 52-0-52-7. The output of each port request control, port 0 request control 52-0, ... port 7 request control 52-7, couples corresponding specific request signals to an activity priority select control 56. Based on the timing of the request, the memory unit being selected, the type of request being made, and the availability of the hardware required in order to grant the request, the activity priority select control 56 accepts the request and couples an accept request signal, P0-ACPT-REQ, ... P7-ACPT-REQ, to the corresponding port, port 0 51-0 ... port 7 51-7. In addition, various control signals are coupled from the activity priority select control 56 to activity registers 58, and memory data registers (not shown) of the activity registers logic unit 58 for interfacing with the bus 220. In the preferred embodiment of the present invention, logic exists for providing up to five activities to be in process simultaneously, or concurrently an activity being the acceptance and execution of a port request. A memory unit busy control unit 54 is included for processing and maintaining information regarding the busy/unbusy status of memory unit 0 200 through memory unit 15 215. Corresponding status signals are coupled from the memory unit busy control 54 to the corresponding port request control logic 52-0 through 52-7.

The acceptance of a port, thereby permitting communications with the SCU 50/memory 20 when simultaneous (or near simultaneous) requests have been made by the equipment connected to the SCU 50, is based on a priority hierarchy in which the ports have assigned an initial priority for each command level, but the priority within a command level changes (i.e., rotates) when a request within that command level has been serviced; however, the priority change is conditioned upon there not being a higher priority port request pending within that command level. The granting of requests in accordance with the priority scheme is more fully described in above-mentioned related application and will not be discussed here, except when such description aids in the understanding of the activity monitor and control apparatus of the present invention. The port servicing is based on levels of commands from the equipments attached to the SCU 50.

Figure 3:
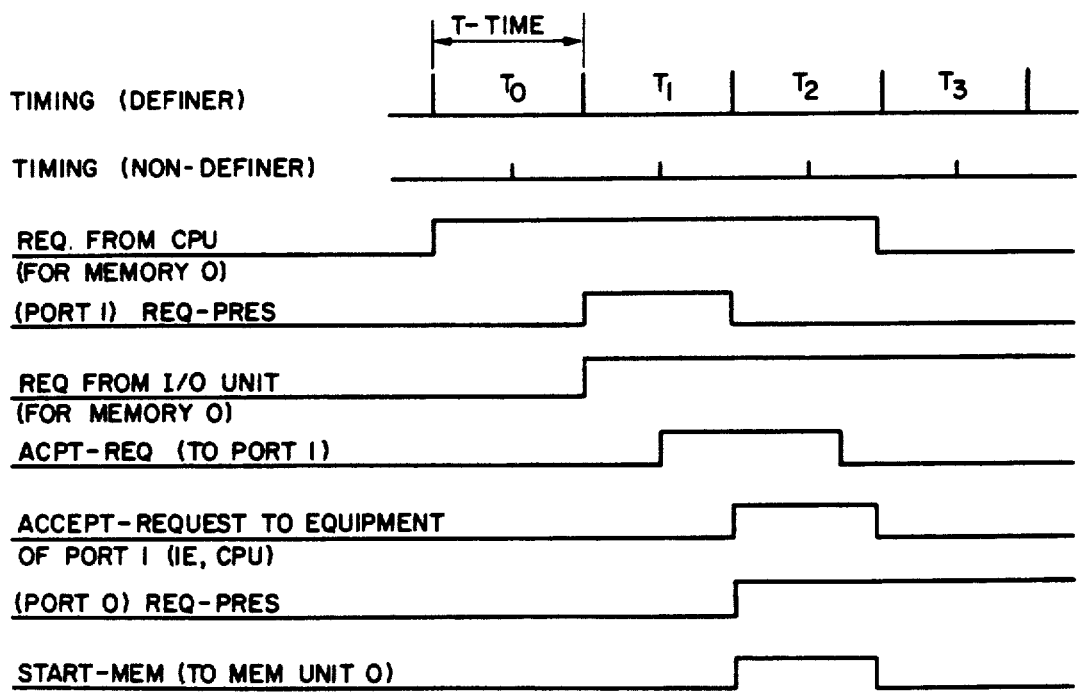
FIG. 3 shows a timing diagram of requests from two different ports for the same memory unit.

The acceptance operation of the preferred embodiment will now be described in conjunction with FIGS. 2, 3 and 4. FIG. 3 shows a timing diagram of requests having the same command level for the same memory unit, one request being made a clock time (T-TIME) later. FIG. 4 shows a timing diagram of requests having the same command level, from the equipments, being made simultaneously, i.e., the same clock time. In should be noted here that the SCU 50, memory 20, and SCU-equipment interface timing is on a synchronous basis.

Referring to FIG. 3, there is shown a clock signal, also referred to as timing definer, CLK-DEF. A clock period is referred to as a T-TIME. A second clock signal (or timing, non-definer) is shown whereby a clock pulse is generated every half period of a T-TIME. In the example of FIG. 3, a request from the CPU 30 for memory 0 occurs at the start of the $T_0$-TIME. This request is via interconnect line 31. A request present signal, outputted from port 1 51-1 (Pl-REQ-PRES), is outputted at the start of $T_1$ and coupled to the corresponding port 1 request control 52-1. Also at the start of $T_1$ a request from the I/O unit 40 is made requesting memory 0, this request being made via interconnect line 41. A T-TIME later, i.e., the start of $T_2$, port 0 51-0 outputs the request present signal (PO-REQ-PRES) and is coupled to the port 0 request control 52-0. However, during the $T_1$ time, the port 1 request control logic 52-1 and the activity priority select control logic 56 caused the accept request signal for port 1 (Pl-ACPT-REQ) to be generated and coupled back to port 1 51-1. As a result, at the start of $T_2$ the memory unit 0 200 has been selected and caused to indicate a busy condition such that when the port 0 request control logic 52-0 processes the request present signal from port 0, the memory requested will be unavailable, thereby holding up (i.e., low or inactive) specific request signals (PO-PREQ-GO, PO-LPREQ-PRES, PO-HPREQ-PRES, and PO-HPRI REQ) to the activity priority select control 56.

Referring to FIG. 4, there is shown the control signals generated as a result of simultaneous requests (the timing of FIG. 4 shows a two-word write to memory operation, the requests can be for any command within the same command level). During the $T_0$ time, requests from the I/O unit 40 and the CPU unit 30 are made via interconnect lines 41, 31, respectively, at the start of the $T_0$ time. The information contained on the interconnect lines 41, 31 include address, zone, data, and command/control information. Port 0 51-0 and port 1 51-1 perform some processing on the command and address information during the $T_0$ time such that the respective memory select bits (0-3) are coupled to the memory unit busy control 54, and command bits (0-5) are coupled from the respective port 51 to its corresponding port request control 52. Address bits (0-27), command bits (0-5), and zone bits (0-3) from each port 51 are coupled to the activity registers logic unit 58. In the preferred embodiment, a 36-bit CPU word is utilized (plus 4 additional parity bits), each word having four nine-bit bytes. The zone bits identify a byte within a word, and the address bits define the address of the memory location and the memory unit. In response to the request for the corresponding equipment, port 0 generates the port 0 request present signal (P0-REQ-PRES) and port 1 51-1 generates the port 1 request present signal (Pl-REQ-PRES) at the start of the $T_1$ time. As a result, port 0 request control 52-0 and port 1 request control 52-1 couple the corresponding specific request signals (PX-PREQ-GO, PX-LPREQ-PRES, PX-HPREQ-PRES, and PX-HPRI-REQ, where X=0 for port 0 and X=1 1 for port 1) to the corresponnding activity priority select control 56. At this point the priority select logic of activity priority select control 56 becomes operative and as a result, a decision is made to accept one of the requests from either port 0 or port 1, the request being accepted being the request from the port having the highest priority. This determination is made during the $T_1$ time. If the command levels are equal, the highest priority port is serviced first within the command level. If the command levels are unequal, the port with the highest command level is serviced first. As a result of the operation of the priority select logic of the activity priority select control unit 56, the accept request signal is generated for port 0 (P0-ACPT-REQ), this signal being coupled back to port 0 51-0 before the start of the $T_2$ T-TIME (assuming for purposes of example here that port 0 has the higher priority at this time). If the memory unit selected by port 1 is different than the memory unit selected by port 0, and the bus 220 would be available during the proper time, and other conditions are met; namely, logic required to perform the command is available at the correct time, i.e., the time the command is actually executed, the port 1 request will be accepted during the $T_2$ T-TIME (the Pl-ACPT-REQ signal shown in FIG. 4 by the dotted line). This signal would be coupled back to port 1 51-1 before the start of the $T_3$ T-TIME. The start of the start activity signal (START-ACT) starts the memory cycle and the memory unit selected by the port 0 request indicates a busy condition. The remainder of the signals shown in FIG. 4 basically show some of the memory interface timing. During $T_2$, the address bits ADR (0-27), and the zone bits (0-3), and the command to memory are coupled to the memory 20. In addition, the data from the port (PC-DTA), in this case port 0, is coupled to the activity registers 58, the first 40-bit word being available the first half of the $T_2$ time, and the second 40-bit word being available to the activity registers 58 during the second half of the $T_2$ time. The 40 bit word of the preferred embodiment includes the 36 bit data word plus four parity bits. The data to be written into memory is then placed on the bus 220 during the $T_4$ time. During the $T_6$ time, the memory status word is read from the memory 20 to the SCU 50. This cycle makes up the minimum write cycle time of the system of the preferred embodiment.

The various signals received via the interconnect lines 31, 41 by the port 51 are registered within the port logic (not shown) during the $T_0$ time. As a result, the various signals required to process the request (PX-REQ-PRES wherein X indicates port 0-7), the command signals (PX-CMD[0-5]), the memory select signals (PX-MEM-SEL)[0-3]), and the address and zone signals (P0-ADR[0-27]and PX-ZONE[0-3]), are available to the remaining logic of the SCU 50.

Figure 5:
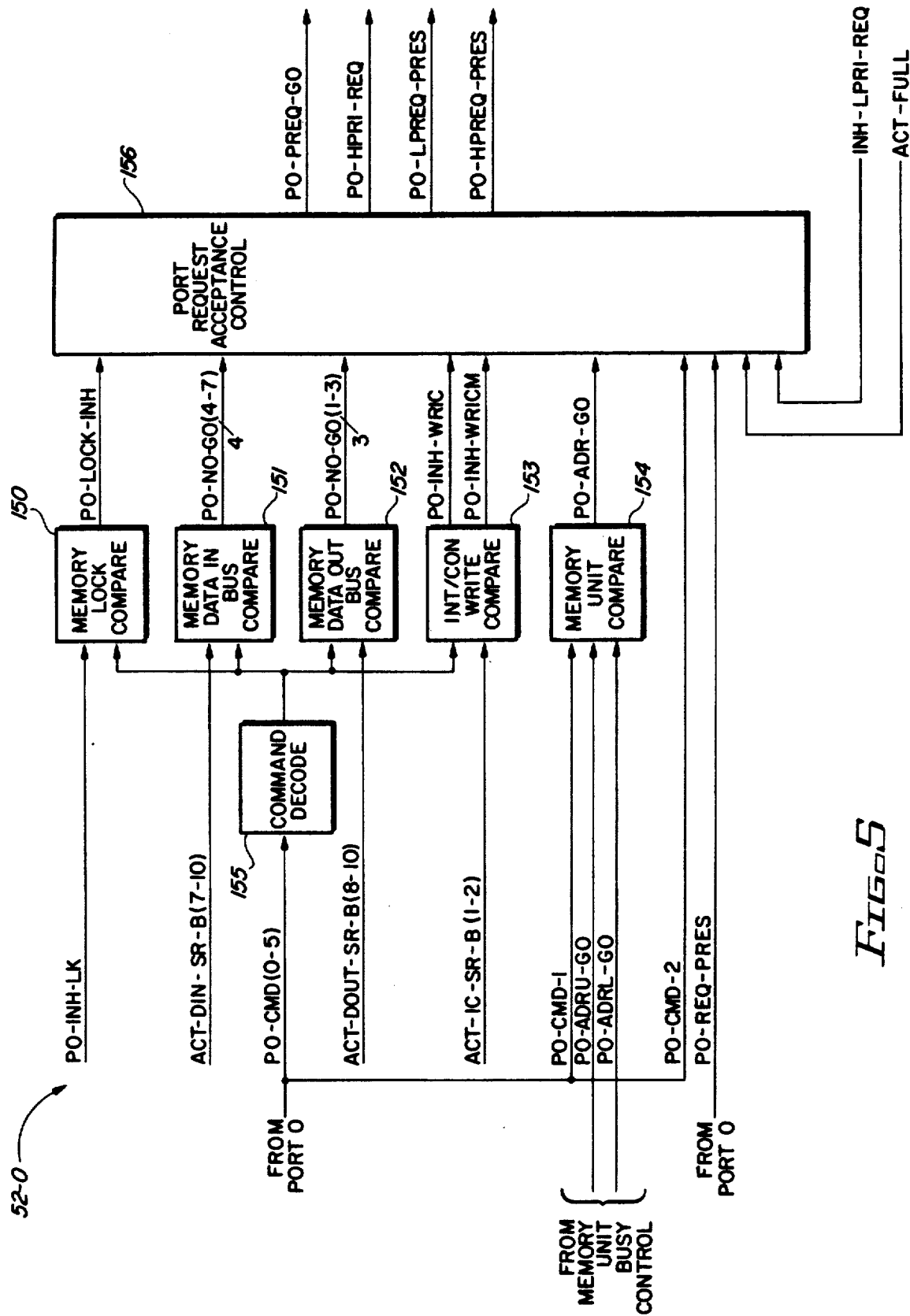
FIG. 5 shows a functional block diagram of the port request control unit of the system control unit of the preferred embodiment.

Referring to FIG. 5, there is shown a functional block diagram of the port request control 52. The request present signal and the command signals are received from the corresponding port along with various control signals from the memory unit busy control unit 54 and the activity registers 58. (Note that the signal designation of the port request control unit 52 shown in FIG. 5 has the reference numerals specifically related to the port 0 request control 52-0. However, this logic is repeated for each of the port request control units 52 having the specific PX signal, where X specifies the respective port.) The inhibit lock signal, P0-INH-LK is a control signal generated in response to read lock commands, which direct the SCU to lock all memory units against read lock and write honor lock commands from other ports. The memory units are unlocked by the next serviced command from the original locking port. The activity registers 58 include a plurality of data control shift registers, each position of the shift register corresponding to a time slot in which the memory input bus or the memory output bus of bus 220 will be active as a result of an activity which has been accepted, and will be discussed in further detail hereinunder. The data, in a group of data control shift registers of activity registers 58, forms a control signal (ACT-DIN-SR-B[7-10]) which indicates a anticipated input bus busy condition during a future time period and is coupled to a memory DATA-IN bus compare unit 151. Similarly, if data is to be read from a memory unit as a result of an activity, a second group of data control shift registers of the activity registers 58 indicates the time slot the data output bus of bus 220 will be busy, predetermined bits (bits 8-10) of the second shift register forming control signal ACT-DOUT-SR-B(8-10) and is coupled to the memory DATA-OUT bus compare unit 152. The foregoing will be described in further detail hereinunder. Similarly, interrupt/connect queues, which are internal registers of the SCU 50, can also be accessed, and a control signal, ACT-IC-SR-B(1-2), indicating some internal logic of the SCU 50 will be busy, is coupled to an INT/CON write compare unit 153. Control signal ADRU-GO from the memory unit busy control 54 indicates whether the upper memory units, memory units 0-7 (200-207) are available, and control signal ADRL-GO indicates whether the lower memory units, memory units 8-15 (208-215), are available, these control signals being produced by the memory unit compare 154. The outputs of each of the compare units 150-154 are coupled to the port request acceptance control 156. If the memory and bus required for the commanded operation are not busy, and the logic required for the commanded operation is available during a predetermined future time period(s) as indicted by the control signals from the activity registers 58, the port request acceptance control 156 outputs the predetermined specific request signals to the activity priority select control unit 56.

Figure 6A:
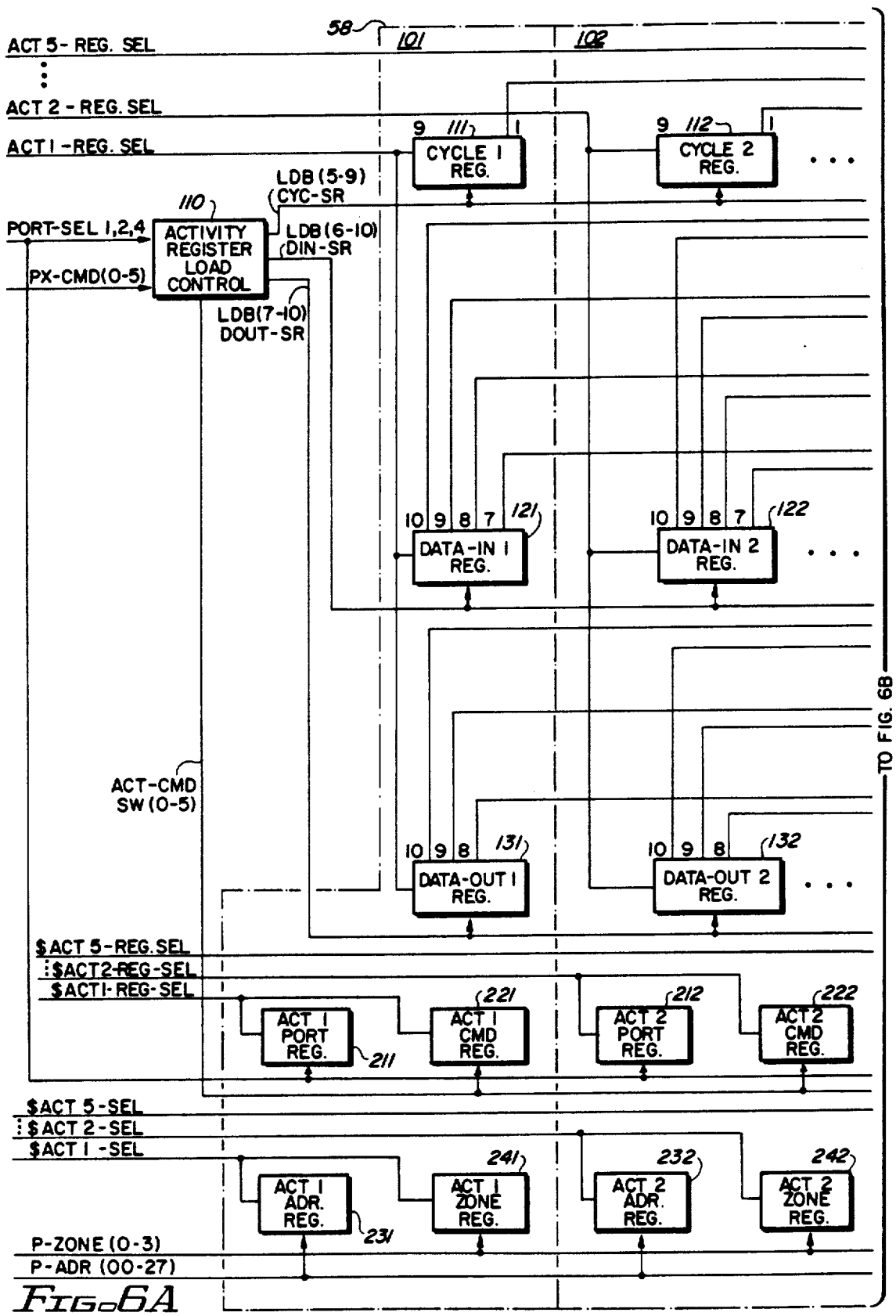
FIGS. 6A and 6B, which taken together comprise
Figure 6B:
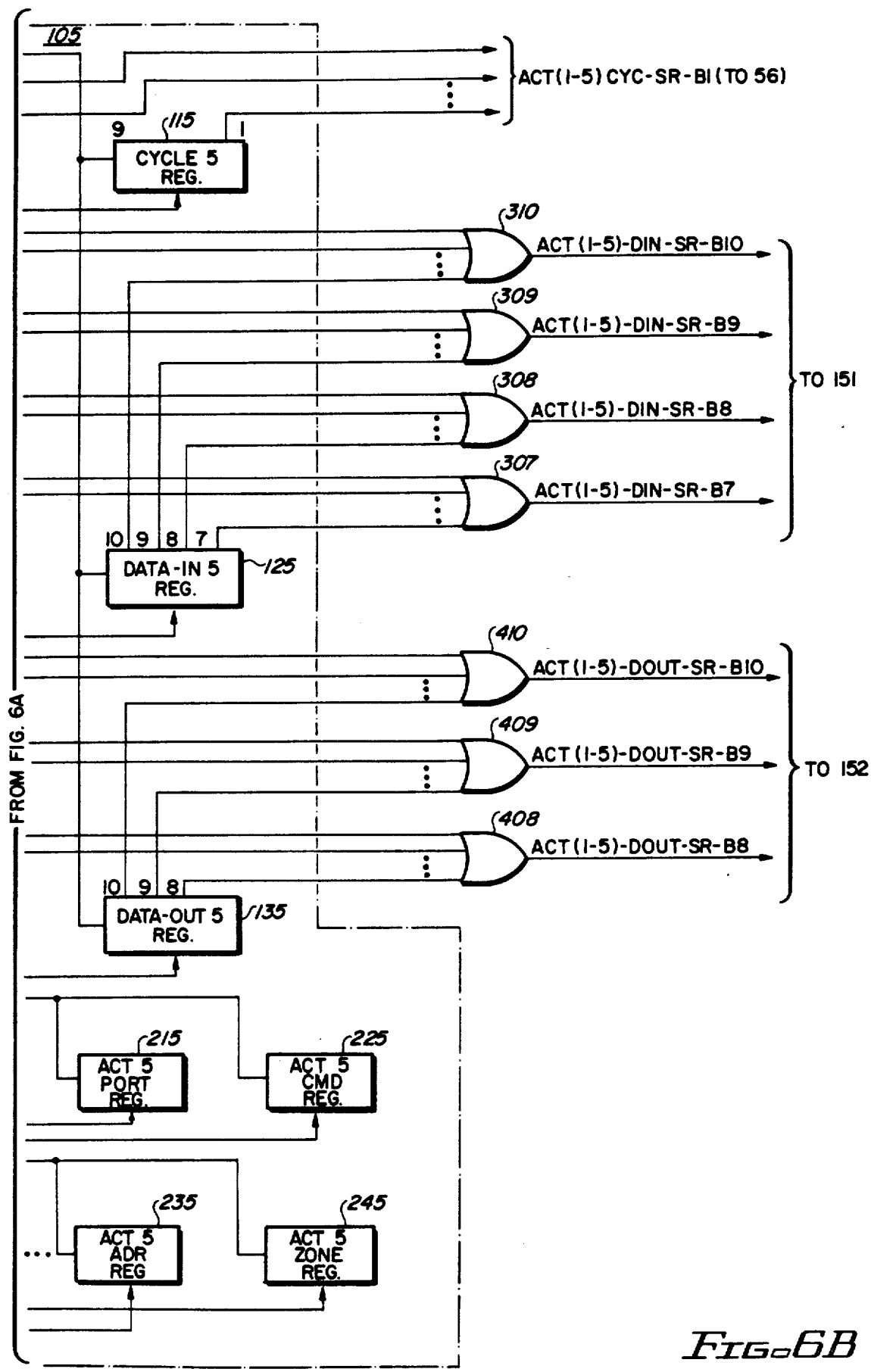

The activity monitor and control apparatus of the present invention will now be described. Referring to FIGS. 6A and 6B, which taken together comprise FIG. 6, there is shown a functional block diagram of the activity registers 58. The activity registers 58 are formed by five groups of registers 101, 102, 103, 104, 105, wherein each group is dedicated to an activity. Each group includes a cycle register (CYC) 111, 112, . . . 115, a DATA-IN register (DIN) 121, 122, 125, a DATA-OUT register (DOUT) 131, 132, . . . 135, a port register 211, 212, . . . 215, a command register (CMD) 221, 222, 225, an address register (ADR) 231, 232, . . . 235, and a zone register 241, 242, . . . 245. Each group is designated as an activity, i.e., activity 1, activity 2, . . . and activity 5. When a request is made from an equipment, and if conditions are met which will permit accepting the request, the request is assigned an activity, i.e., a group of registers which are available. Bit 1 of each cycle register 111, 112, . . . 115, i.e, signal ACT (1-5)-CYC SR-Bl, is coupled to the activity priority select control 56 which is utilized therein to determine accepting the pending request. If all the activity registers are unavailable, i.e., five activities are in process, the request cannot be accepted. If an activity register group is available, before a request can be accepted, the activity being requested cannot conflict with activities already accepted. Bits 7-10 of the DATA-IN registers are OR'd respectively in OR-gates 307-310, the resulting signals collectively identified as ACT (1-5)-DIN-SR-B (7-10), which are coupled to the memory DATA-IN bus compare unit 151, and are utilized to determine whether a conflict will occur with the pending request. Similarly, bits 8-10 of the DATA-OUT registers are OR'd respectively in OR-gates 408-410, the resulting signals collectively identified as ACT (1-5)-DOUT-SR-B (8-10), which are coupled to the memory DATA-OUT bus compare unit 152. The port registers 211-215, the command registers 221-225, the address registers 231-245, act as support registers which will become more apparent below. The activity registers are selected by control signals from the activity priority select control 56, upon the acceptance of a request. The cycle register, the DATA-IN register, and/or the DATA-OUT register of the selected activity group are loaded by the activity register load control 110 as a function of the port command, as will be described further hereinunder.

The operation of the activity monitor and control apparatus will now be described. The System Control Unit (SCU) 50 of the preferred embodiment is an eight port, eight memory controller, five activity, synchronous clock device, as described above. From one to eight port controllers (or more simply port) 51 can have equal access to/from one to eight memory controllers (not shown) of the memory 20, internal registers, via SCU 50 data paths and activity control. An SCU activity is defined as the logical response and servicing of a port controller's request for service to communicate with either a memory control unit or an internal SCU register. Five SCU activities can be in progress simultaneously. The type of port controller service request may be memory controller (or more simply memory 20) related, where data is transferred to or from a memory controller through the SCU 50, or non-memory, where data transfers instead between an internal SCU register and the port controller. In either case, a non-memory service request is serviced with an activity timing structure that emulates a memory controller data transfer, except no memory controller 20 is accessed. Each port controller service request, when accepted by the SCU 50, is logically assigned an unused activity (i.e., unused group of activity registers) within the SCU 50 control. The activity assigned remains dedicated to the port controller service request until the activity is terminated. The length of the activity cycle varies and is determined by the type of service requested by the port controller.

Each activity is logically controlled by one group 101-105 of three SCU activity shift registers, CYCLE (CYC) 111-115, DATA-IN (DIN) 121-125 and DATA-OUT (DOUT) 131-135, and four support registers, denoted ADDRESS (ADR) 231-235, COMMAND (CMD) 221-225, ADDRESS ZONE (ZONE) 241-245, and PORT NUMBER (PORT) 211-215. The activity shift registers are of particular interest, because in combination, they accept or reject port service requests, and in association with the activity support registers, they control the activity cycle, reading or writing registers and controlling switches which will be described further hereinunder. The activity shift registers are written into at the beginning of a designated T-time, and shifted each T-time. The activity support registers are also written into at the same designated T-time. A T-time, as mentioned above, is a two clock period with the starting clock the "defined" clock, and the mid T-time clock the "undefined" clock. A T-time is therefore the synchronous time between the trailing edges of two defined clocks.

The activity CYCLE shift register is nine bits in length. Bit one (B1) is designated the least significant bit, the last bit position when shifting the register from left to right. The contents of the CYCLE shift register determines the length of the activity cycle. The initial state of the CYCLE shift register is zero in all bit positions. Importantly, a zero in bit position B1 indicates the activity logic is available for service request use. Each bit position represents a T-time, since the shift register shifts right one bit position each defined clock. When the activity logic, i.e., an activity register group 101–105, is selected for use, a predetermined number of "one" bits is set in the CYCLE shift register 111 (only the activity 1 reference numerals will be used although it will be understood that the corresponding reference numeral can be used for the corresponding activity group) to represent the length of the activity cycle consistent with the type of service requested by the port controller 51. The number of bits set are one less than the length of the cycle. This is necessary to avoid unavailability of the activity logic for a T-time at the end of the cycle. When bit B1 changes to zero for a T-time, the activity is still in progress, but the activity CYCLE shift register will be indicating availability for that T-time. The contents of the activity CYCLE shift register for a service request to write two words of data to a memory controller or an internal SCU register is as follows:

| B9 | B8 | B7 | B6 | B5 | B4 | B3 | B2 | B1 | |
|---|---|---|---|---|---|---|---|---|---|
| 0 | 0 | 0 | 0 | 0 | 1 | 1 | 1 | 1 | START OF ACTIVITY |

| B9 | B8 | B7 | B6 | B5 | B4 | B3 | B2 | B1 | |
|---|---|---|---|---|---|---|---|---|---|
| 0 | 0 | 0 | 0 | 0 | 0 | 0 | 0 | 1 | END OF ACTIVITY + 2T |

| B9 | B8 | B7 | B6 | B5 | B4 | B3 | B2 | B1 | |
|---|---|---|---|---|---|---|---|---|---|
| 0 | 0 | 0 | 0 | 0 | 0 | 0 | 0 | 0 | END OF ACTIVITY + 1T (Activity Logic Available) |

The activity DATA-IN shift register 121 monitors the flow of data from the port controller 51 through the SCU 50 to the memory controllers 20 or internal SCU registers during an activity cycle. Bit positions in the activity DATA-IN shift register 121 represent controlled activity events. A bit position may represent the presence of data at the input to a register or in a register, on a bus, or into a switch, the data flow through the SCU 50 to be described hereinunder. A bit position also relates to the generation of activity signals such as ACTIVITY STATUS. ACTIVITY STATUS is presented to the port controller 51 being serviced by the activity logic and represents the success or failure of the activity. Like the activity CYCLE shift register 111, the activity DATA-IN shift register 121 shifts right each T-time. Bit position representation during this activity is as follows:

B6—Data is present on the port controller 51 to SCU data bus.

B4—Data is present on the SCU to memory controller bus.

B2/B1 ACTIVITY STATUS is available to the port controller.

The type of service request accepted for the activity determines the bit or bits set in the activity DATA-IN shift register 121 at the start of the activity. For example:

| B10 | B9 | B8 | B7 | B6 | B5 | B4 | B3 | B2 | B1 | |
|---|---|---|---|---|---|---|---|---|---|---|
| 0 | 0 | 0 | 0 | 1 | 0 | 0 | 0 | 0 | 0 | WRITE 2 WORDS |

| B10 | B9 | B8 | B7 | B6 | B5 | B4 | B3 | B2 | B1 | |
|---|---|---|---|---|---|---|---|---|---|---|
| 0 | 1 | 1 | 1 | 1 | 0 | 0 | 0 | 0 | 1 | WRITE 8 WORDS |

| B10 | B9 | B8 | B7 | B6 | B5 | B4 | B3 | B2 | B1 | |
|---|---|---|---|---|---|---|---|---|---|---|
| 1 | 0 | 0 | 0 | 0 | 0 | 0 | 0 | 0 | 0 | READ 2 WORDS ALTER WRITE 2 WORDS |

The activity DATA-OUT shift register 131 monitors and controls the flow of data from a memory controller 20 or an internal SCU register (not shown) through the SCU 50 to the port controller 51 during an activity. Like the activity DATA-IN shift register 111, bit positions in the DATA-OUT shift register 121 represent controlled activity events. Bit position examples for the activity DATA-OUT shift register 121 are:

B3—Data is present on the memory controller to SCU bus.

B3—The memory controller status is available.

B2—ACTIVITY STATUS is available to the port controller 51.

B2/B1—Data from a memory controller 20 or an internal SCU register is present on the SCU 50 to port controller 51 bus.

The type of service requested by the port controller determines the bit or bits set in the activity DATA-OUT shift register at the start of the activity cycle. For example:

| B10 | B9 | B8 | B7 | B6 | B5 | B4 | B3 | B2 | B1 | |
|---|---|---|---|---|---|---|---|---|---|---|
| 0 | 0 | 0 | 1 | 0 | 0 | 0 | 0 | 0 | 0 | READ 2 WORDS |

| B10 | B9 | B8 | B7 | B6 | B5 | B4 | B3 | B2 | B1 | |
|---|---|---|---|---|---|---|---|---|---|---|
| 0 | 0 | 1 | 1 | 0 | 0 | 0 | 0 | 0 | 1 | READ 4 WORDS |

| B10 | B9 | B8 | B7 | B6 | B5 | B4 | B3 | B2 | B1 | |
|---|---|---|---|---|---|---|---|---|---|---|
| 1 | 1 | 1 | 1 | 0 | 0 | 0 | 0 | 0 | 0 | READ 8 WORDS |

Only one of the five activities can have control of designated registers, switches, or buses internal to the SCU, internal to the port controllers, internal to the memory controllers, or the bus interfaces between the logical units resources of the SCU and memory subsystems for a given T-time. The logic-oring of identical bits within the five activity DATA-IN and DATA-OUT shift registers reflect the actual or anticipated use of a register, switch, or bus during any given T-time for the data flow. The OR-gates 307-310, 408-410 provide the output control signals to logically decide whether a port controller service request will be accepted during a given T-time. The primary concern in the decision process is the availability of the SCU 50 to memory controller data bus (DATA-IN shift register) and the memory controller to SCU central data bus (DATA-OUT shift register) based on the type of port controller service request. Since data associated with only one service request activity can be present on either bus, or any other buses during any given T-time, the look ahead feature of the collective-oring of the five SCU activity DATA-IN and DATA-OUT shift registers allows port controller service request acceptance based on the availability of the required registers, switches, and buses after the start of the activity.

Figure 7:
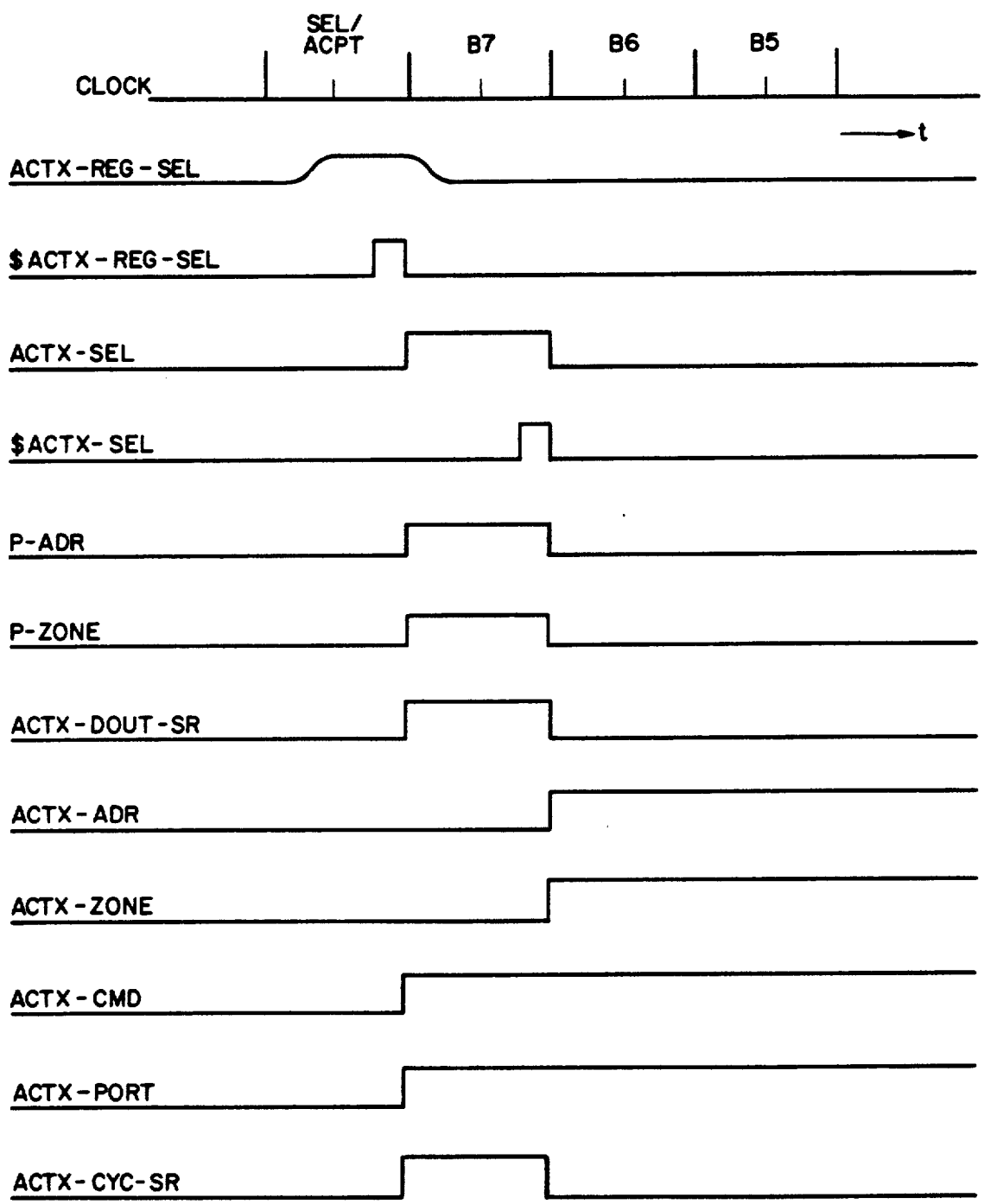

Referring to FIG. 7, there is shown a timing diagram of the select signals and with respect to loading the activity registers for a two-word read request. The select signals with a leading $ are clocked signals, and the X has a value of 1, 2, 3, 4, or 5 corresponding to the activity group available and selected. SEL/ACPT is the T-time utilized in the select/acceptance of a request for service. B7 corresponds to the next T-time, wherein bit 7 (B7) is set in the DATA-OUT register 131 and shifted to the B6 position the next T-time, and so on, thereby denoting the length of the specific activity.

Figure 8:
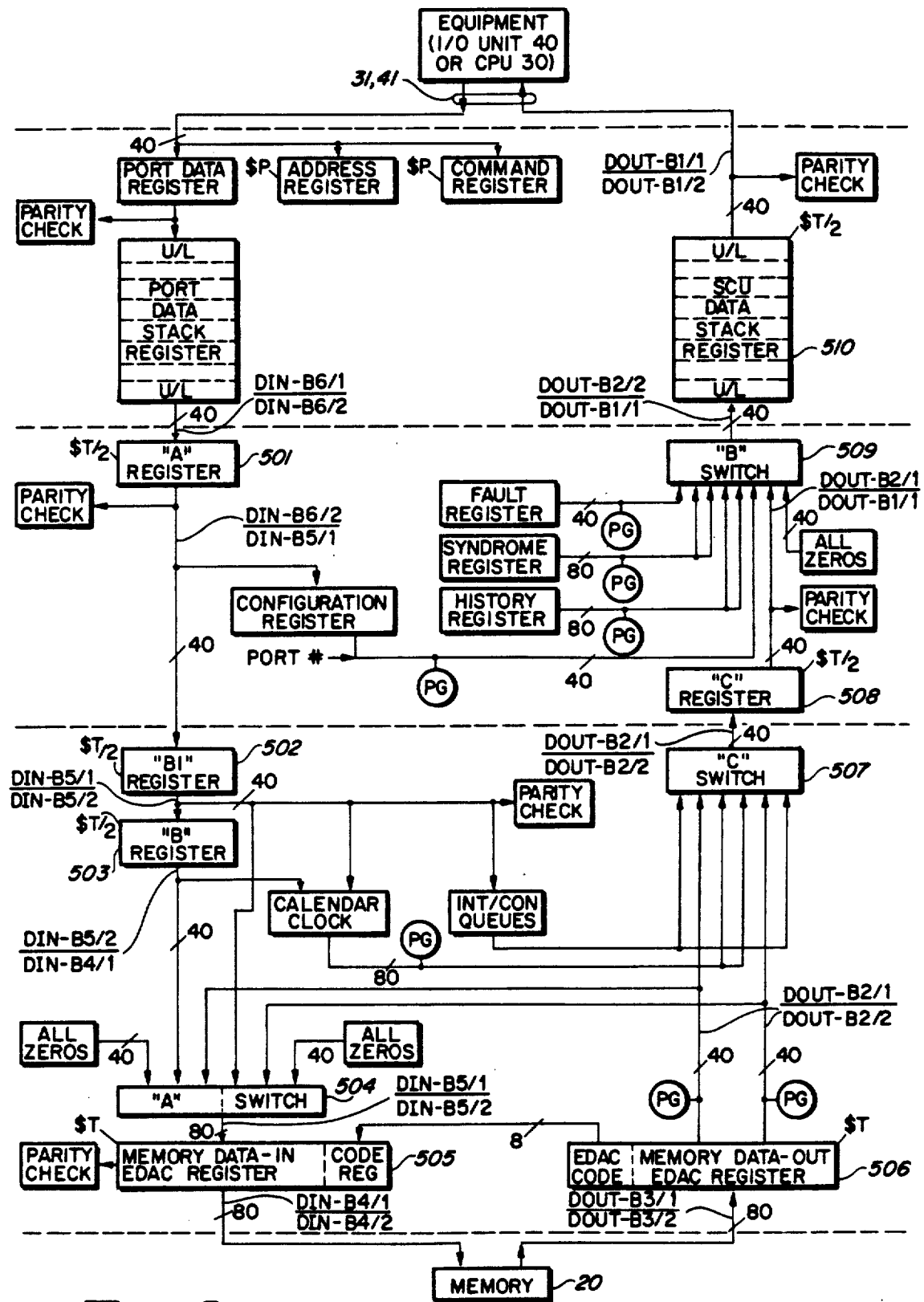
FIG. 8 shows a data flow diagram of the data to and from a port controller to a memory controller through the system control unit of the preferred embodiment.

Referring to FIG. 8, there is shown a SCU data flow diagram showing the flow of data to and from the port 51 and memory controllers 20 via the SCU 50. Internal registers and switches of the SCU 50 are shown. In the preferred embodiment, data always flows in multiples of two word pairs, normally the even word first and the odd word second. Each word consists of four ten bit bytes, nine data bits and one odd parity bit. Except for the memory controller interface data registers (not shown) all SCU registers through which data flows to or from the memory and port controllers or internal registers are freely clocked every half T-time, denoted by $ T/2. The memory controller interface registers (not shown) are freely clocked every T-time by the defined clock, denoted by $T.

Data flow from the port controller 51 through the SCU 50 data registers and switches to the memory controller 20 or an internal SCU register begins at the start of an SCU activity when the port controller's request for service is accepted. If the service request is memory controller related, a memory controller cycle is initiated at the memory controller addressed by the service request. At the start of the activity, the port controller switches the upper 40 bit word of a two word pair on the data bus between the port controller and the "A" register 501 in the SCU 50. A half T-time later the lower 40 bit word is switched onto the bus as the upper word is clocked into the "A" register. If the service request requires a four, six, or eight word transfer from the port controller to the memory controller, the appropriate number of contiguous words follow, alternating between the upper and lower words in a pair. One half T-time after data enters the "A" register, the data transfers into the "B1" register 502, and one half T-time later into the "B" register 503. The SC of the preferred embodiment is such that at a defined clock time, the "B" register 503 will contain the upper word of a word pair and the "B1" register 502 will contain the upper word of a word pair, and the "B1" register will contain the lower word. Thus, the "A" switch 504 presents the word pair at its output to the Memory DATA-IN EDAC register 505, which is clocked by the defined clock. (In the preferred embodiment, an eight bit EDAC code is generated from the 80 bits [72 data bits + 8 parity bits] contained in the Memory DATA-IN EDAC register 505 for one T-time and placed, along with the 72 data bits, on the DATA-IN bus to the memory controllers.) The next defined clock enters the data into the addressed memory controller's DATA-IN register. If more than one word pair is to be transferred, subsequent defined clocks will enter the additional word pairs into the memory controller 20.

For the non-memory write activity, the data flow through the registers, switches, and buses is identical time wise, except a memory controller cycle is not started. Data is entered into the register designated by the type of port controller service request at the appropriate T-time. The activity logic assigned to the service request generates the register write gate. Data will be present on the memory controller DATA-IN bus, but since no memory controller cycle was started, no data is entered into a memory controller DATA-IN register.

The opposite of a port controller write service request is a read request, and the data source will be either a memory controller 20 or a SCU internal register. The data flow time relationship to the port controller 51 is the same. From the memory controller, 72 bits of data and 8 bits of EDAC code are placed on the memory controller DATA-OUT bus at the beginning of a T-time and held until the next defined clock. If the type of port controller service request requires the transfer of four, six, or eight words of data, then continuous data word pairs are placed on the bus. The defined clock subsequent to the placement of data on the bus enters the 80 bits into the Memory DATA-OUT EDAC register 506, where EDAC checking and correction, if necessary and possible, is implemented. Byte parity for the data is also generated. One half T-time later, the upper word of the data is entered into the "C" register 508 through the "C" switch 507. Another half T-time later, the lower word of the data pair is entered into the "C" register 508, and the upper word being held enters the port controller's DATA-OUT Stack register 510 via the "B" switch 509, where the data is placed on the SCU-port device interface. Still another half T-time later, the lower data word enters the port controller's DATA-OUT Stack register.

For a non-memory read activity, the data flow through the registers, switches, and buses is identical timewise except a memory controller cycle is not started at the beginning of the activity. Switch selection is controlled by the type of service request accepted for the activity. At the appropriate T-time, switch positioning accepts data from the register addressed, and data flows to the port controller DATA-OUT Stack register.

As described above, activity timing is related to the availability of the DATA-IN and DATA-OUT memory controller buses. Thus, a non-memory activity has the same activity timing as a memory activity, except the memory controller cycle is not started. When writing data to memory, as in the case of a two data word port controller service request for example, the memory controller expects the data to be present on the memory controller DATA-IN bus two T-times after the start of the memory controller cycle. If the activity service request requires eight data words to be transferred, data must be present on the memory controller DATA-IN bus for four contiguous T-times, two T-times after the start of the memory controller cycle. Reading data from a memory controller is similar. A two data word memory controller read activity requires that data be present on the memory controller DATA-OUT bus four T-times after the start of the activity and start of the memory controller. As with DATA-IN bus, an eight word read would require four contiguous T-times of bus activity for the data, four T-times after the start of the activity.

Data flow through the SCU registers and switches, to and from the port controllers 51 and memory controllers 20, is conditioned by the activity service request command accepted. For a memory related command, data begins at the port controller or memory controller and flows to the memory controller or port controller. At the start of an activity, both the source and terminating controller is aware of the activity command which results in the required synchronous data flow. If the activity involves an internal SCU register, the data is inserted or terminated at the proper T-time after the start of the activity in place of the data that would flow to or from a memory controller.

The notations at the outputs of the registers and switches along the data flow paths between the memory and port controllers on FIG. 8 indicate the assigned bit positions of the DATA-IN and DATA-OUT control shift registers for the data word pairs. These assignments provide the control of switches and the gating of internal SCU registers by the activity control logic. It also provides error checking by identifying when valid data is present within a register. Examples of the notations and their meaning will now be explained.

At the output of each register and switch is an upper and lower case notation. The upper case identifies that portion of a T-time that the even word of a word pair will be present at the output of a register or switch, or on a bus. The two portions of the T-times are the first (1) and the second (2). The lower case identifies that portion of a T-time that the lower word of a word pair will be present. Using an example, the port DATA-IN register stack, the upper case notation is DIN-B6/1. This indicates that if bit 6 is set in an activity DATA-IN control shift register, the upper word of a data word pair will be present at the output of the port DATA-IN register stack during the first portion of the bit 6 T-time. The notation is /1. The lower case notation is DIN-B6/2 which indicates the second word, the odd word of the two word data pair, will be present at the output of the port DATA-IN register stack during the second portion of the bit 6 T-time. The notation is /2.

A second example would be the output of the "C" register. The upper case notation indicates the upper, or first word, of a two word pair would be present during the second portion of the bit 2 T-time of an activity DATA-OUT control shift register. The lower notation indicates the second word, or second word, of the two word pair would exist for the first portion of the B1 T-time, half a T-time later. Since the two words of data are assigned the last portion of bit 2 and the first portion of bit 1 for the activity DATA-OUT control shift register, the logic is provided with a definite time period to check the parity of the data words. The same philosophy can then also be applied to the control switches and the gating of data into registers.

The port controller service request command, the activity command, and the activity DATA-IN and DATA-OUT shift registers combine to control the flow of data through the SCU 50. Referring to Table 1, the activity DATA-IN shift Register Compare/load table, a port controller service request scenario can be described. Table 1 tabulates the OR'd output bits of the five activity DATA-IN control shift register bits that are compared for port command acceptance. Those bits that are set, based on command acceptance, are also tabulated.

For purposes of example a service request to write two data words to a memory controller will now be described. Before accepting the request and starting an activity, the SCU 50 must ensure that there will be no conflicts in the data flow path due to the presence of other activities, since up to five activities can be in progress simultaneously. There are also other considerations that must be addressed before starting an activity such as the readiness of the memory controller being addressed and port priority, but they will not be discussed here since they do not affect the understanding of the present invention. Referencing Table 1, the Activity DATA-IN Shift Register Compare/load table, it can be seen that the OR'd bit 7 of the five DATA-IN activity shift register cannot be a logic one ("1"), or true, during the T-time the port controller's request for service is being considered. If bit 7 is a "1" presently, then one T-time later bit 6 will be a "1". This is unacceptable because at bit 6 T-time, the bit indicates another port controller will be placing data on the port controller to the SCU data bus. This conflicts with the port controller being considered for service request acceptance because it must use the data bus at the start of its activity, the next T-time. As shown in Table 1, for a given T-time, a port controller's write two words request for service will be accepted only if the OR-ing of all five activity DATA-IN shift registers does not produce a "1". If a "0" is produced, the port controller's service request is accepted, and a "1" is set in the bit 6 position of the activity DATA-IN shift register assigned to the port controller. The bit set in the bit 6 position of the activity DATA-IN shift register 111 will now monitor and control the flow of the two data words to the addressed memory controller 50. The bit's position in the shift register, each subsequent T-time, reflects the register and bus location of the data words. From this information the data's parity can be checked at each register position, and at the end of the activity, an activity status can be compiled and forwarded to the port controller 51.

The situations that produce a "1" bit in the OR'd bit 7 output of the activity DATA-IN shift registers is the acceptance of a port controller's service request for either a write four word, six word, eight word, write one word, or read two words and clear one or two words activity during a prior T-time. Again, referencing Table 1, note that bit 7 can go to a "1" as a result of setting the required bits in the activity shift register. The command to write one word is still a two word transfer between the port controller and the addressed memory controller. The activity involves reading two words from memory, altering one of the two words, and writing the two words back to memory. The port controller must hold the two data words, one of which is to be the alter word, until the two words are read from memory to merge at the "A" switch 504. One of the two words read from memory and one of the two words from the port controller will merge through the "A" switch 504 and be written to memory. The read two words and clear one or two words commands are similar to the write one word command, since two words are read from memory and either one or two words are replaced by all zeros when the write to memory is executed.

It can be seen that the compare and the load bits vary for an activity and are dependent upon the port controller's type of service request. For a request to write eight data words, the OR'd activity DATA-IN shift register bits 7, 8, 9 and 10 must be "0" during the decision T-time for the request to be accepted. If acceptance occurs, bits 6, 7, 8 and 9 are set in the assigned activity DATA-IN shift register. This would prevent acceptance of another write request other than a write single or read and clear command for up to four T-times.

The activity DATA-OUT shift registers functionality is similar to the activity DATA-IN shift register except different bits are compared and loaded since the data path time relationship is different. The OR'd activity DATA-OUT shift register bits 8, 9, and 10 are compared for zeros depending upon the service request command, and bits 7, 8, 9 and 10 are the bits loaded. Bit 7 represents the time data from the memory controller is on the memory controller to SCU bus. Bit 6 represents the presence of data in the Memory DATA-OUT EDAC register 506. The first half of the bit 5 T-time indicates the presence of an upper word of a two word pair in the "C" register 508, while the second half of the bit 5 T-time would indicate the presence of the lower word in the "C" register 508. Each bit period, or half period therefore represents the position of data in the data flow path. This means each register, switch, and bus is assigned an activity shift register bit position.

Table 2 tabulates the activity DATA-OUT control Shift register bits that are compared and set based on the port command of the preferred embodiment. Table 3 indicates the activity CYCLE control shift register bits that are set at the start of an activity for the port command accepted based on commands of the preferred embodiment.

In order to complete the description of the activity monitor and control apparatus of the preferred embodiment of the present invention, the operation of the present invention will now be described by a step-by-step example scenario of the activity acceptance and start up in conjunction with the status of the activity registers, see Table 4. Initially, five sets of activity control shift registers are available, i.e., the SCU is in its initial state with no activity at T0 time. Assume for purposes of this example the highest priority port service request is a write 8 data words to memory. From Table 1, it can be seen that a write 8 words command will be accepted and an activity started if the OR'd compare bits 7, 8, 9, and 10 are not set (this condition is satisfied). The activity starts the next T-time, T1, and as indicated, the activity 1 DATA-IN control shift register has bits 6, 7, 8 and 9 set. Activity 1 was selected because it is the highest priority activity, activity 1 the highest and activity five the lowest, not busy. It is not busy because bit one of the activity CYCLE control shift register is not set. Also, from Table 3, bits 1 through 5 will be set in the activity CYCLE control shift register for the accepted command.

The T1 time becomes the decision period for determining acceptance of a port request to start an activity during the next T-time, T2. Assume the highest priority port command request is a write one data word to memory. The comparison requirement is that bit 8 of the activity DATA-OUT control registers be zero. Since the condition is satisfied, the request can be accepted. Activity 2 will be used because activity 1 is busy (bit 1 is set in the CYCLE control shift register). At T2 T-time bit 10 is set in the activity 2 DATA-IN control shift register, and bit 7 is set in the DATA-OUT control shift register. Bits one through six are set in the activity 2 cycle control shift register. The OR'd total of shift register bits now set become bits 5, 6, 7, 8 and 10 for the DATA-IN control shift registers and bit 7 for the DATA-OUT shift registers. Given these bit configurations and referring to Tables 1 and 2, it can be seen that during the T2 decision period all read commands can be accepted, but only a write one word command would be acceptable.

Assuming that the highest priority command pending is a read eight words command, the activity 3 shift registers will be loaded during T3 T-time for a read 8 words command. Bits 7, 8, 9 and 10 are set (i.e., to a logic 1, or more simply 1) in the activity 3 DATA-OUT control shift register and all the bits of the activity 3 cycle control shift register are set. This command has the longest activity cycle. The OR'd output of the activity shift registers during T3 T-time becomes bits 4, 5, 6, 7 and 9 for the DATA-IN control shift registers and bits 6 through 10 for the DATA-OUT control shift registers. Again, referring to Tables 1 and 2, it can be seen that this bit configuration does not allow the acceptance of any commands. Therefore, no new activity can be started during T4 T-time as noted on Table 4 by the term "NOP", no operation. The shift registers however continue to shift.

T4 T-time is now another decision period for the start of an activity during T5 T-time. Observing the OR'd output of the DATA-IN and DATA-OUT shift registers, and referring to Tables 1 and 2, it can be seen that a write 2 words type of command is the only acceptable type of command. Assuming a write 2 words type of command is requested, the command can be accepted and will be assigned to activity 4. Activities 1 through 3 are still busy. As a result of the acceptance, but 6 is set in the activity 4 DATA-IN control shift register during T5 T-time. Bits 1 through 4 are set in the activity 4 CYCLE control shift register. The or'd output of the shift registers becomes bits 2 through 8 set for the DATA-OUT shift registers. Again there exists a situation where no port commands would be acceptable during T5 T-time to start an activity during T6 T-time. At T6 T-time, however, the DATA-IN and DATA-OUT shift register bit combinations are such that any command type would be acceptable to start an activity during T7 T-time. Also at this time activity 1 is no longer busy. Bit 1 of the Cycle control shift register is reset, so activity 1 will be used to start an activity during T7 T-time if a port command is accepted during T6 T-time, since activity 1 has priority use over activity 5.

TABLE 1

ACTIVITY DATA-IN SHIFT REGISTER COMPARE/LOAD

| PORT COMMAND | MEM CYC | AS BIT | COMPARE BITS 10 | 9 | 8 | 7 | 6 | 5 | 4 | 3 | 2 | 1 | LOAD BITS 10 | 9 | 8 | 7 | 6 | 5 | 4 | 3 | 2 | 1 |
|---|---|---|---|---|---|---|---|---|---|---|---|---|---|---|---|---|---|---|---|---|---|---|
| WRITE GENERAL REGISTER | | 2 | X | X | X | C | X | X | X | X | X | X | 0 | 0 | 0 | 0 | 1 | 0 | 0 | 0 | 0 | 0 |
| WRITE 2 INTERRUPT WORDS | | 2 | X | X | X | C | X | X | X | X | X | X | 0 | 0 | 0 | 0 | 1 | 0 | 0 | 0 | 0 | 0 |
| WRITE 2 CONNECT WORDS | | 2 | X | X | X | C | X | X | X | X | X | X | 0 | 0 | 0 | 0 | 1 | 0 | 0 | 0 | 0 | 0 |
| WRITE INTERRUPT/ CONNECT MASK | | 2 | X | X | X | C | X | X | X | X | X | X | 0 | 0 | 0 | 0 | 1 | 0 | 0 | 0 | 0 | 0 |
| CLEAR ASSOCIATIVE MEMORY | | 2 | X | X | X | C | X | X | X | X | X | X | 0 | 0 | 0 | 0 | 1 | 0 | 0 | 0 | 0 | 0 |
| WRITE MEMORY STATUS | Y | 2 | X | X | X | C | X | X | X | X | X | X | 0 | 0 | 0 | 0 | 1 | 0 | 0 | 0 | 0 | 0 |
| WRITE MEMORY ID | Y | 2 | X | X | X | C | X | X | X | X | X | X | 0 | 0 | 0 | 0 | 1 | 0 | 0 | 0 | 0 | 0 |
| WRITE 2 WORDS | Y | 2 | X | X | X | C | X | X | X | X | X | X | 0 | 0 | 0 | 0 | 1 | 0 | 0 | 0 | 0 | 0 |
| WRITE 4 WORDS | Y | 2 | X | X | C | C | X | X | X | X | X | X | 0 | 0 | 0 | 1 | 1 | 0 | 0 | 0 | 0 | 0 |
| WRITE 6 WORDS | Y | 2 | X | C | C | C | X | X | X | X | X | X | 0 | 0 | 1 | 1 | 1 | 0 | 0 | 0 | 0 | 0 |
| WRITE 8 WORDS | Y | 1 | C | C | C | C | X | X | X | X | X | X | 0 | 1 | 1 | 1 | 1 | 0 | 0 | 0 | 0 | 0 |
| WRITE 1 WORD ZONED | Y | 4 | X | X | X | X | X | X | X | X | X | X | 1 | 0 | 0 | 0 | 0 | 0 | 0 | 0 | 0 | 0 |
| WRITE 1 WORD ZONED, HONOR LOCK | Y | 4 | X | X | X | X | X | X | X | X | X | X | 1 | 0 | 0 | 0 | 0 | 0 | 0 | 0 | 0 | 0 |
| READ 2 WORDS, CLEAR 1 WORD | Y | 5 | X | X | X | X | X | X | X | X | X | X | 1 | 0 | 0 | 0 | 0 | 0 | 0 | 0 | 0 | 0 |
| READ 2 WORDS, CLEAR 2 WORDS | Y | 5 | X | X | X | X | X | X | X | X | X | X | 1 | 0 | 0 | 0 | 0 | 0 | 0 | 0 | 0 | 0 |

NOTES:
(1) BIT 4 IS MEMORY BUS XFER T TIME.
(2) ALL "C" COMPARE BITS MUST BE ZERO. ALL "X" COMPARE BITS ARE DON'T CARE.
(3) Y = YES

TABLE 2

| PORT COMMAND | MEM CYC | AS BIT | COMPARE BITS 10 | 9 | 8 | 7 | 6 | 5 | 4 | 3 | 2 | 1 | LOAD BITS 10 | 9 | 8 | 7 | 6 | 5 | 4 | 3 | 2 | 1 |
|---|---|---|---|---|---|---|---|---|---|---|---|---|---|---|---|---|---|---|---|---|---|---|
| READ GENERAL REGISTER | | 2 | X | X | C | X | X | X | X | X | X | X | 0 | 0 | 0 | 1 | 0 | 0 | 0 | 0 | 0 | 0 |
| READ INTERRUPT/ CONNECT MASK | | 2 | X | X | C | X | X | X | X | X | X | X | 0 | 0 | 0 | 1 | 0 | 0 | 0 | 0 | 0 | 0 |
| READ 2 INTERRUPT WORDS | | 2 | X | X | C | X | X | X | X | X | X | X | 0 | 0 | 0 | 1 | 0 | 0 | 0 | 0 | 0 | 0 |
| READ 2 CONNECT WORDS | | 2 | X | X | C | X | X | X | X | X | X | X | 0 | 0 | 0 | 1 | 0 | 0 | 0 | 0 | 0 | 0 |
| ACCEPT INTERRUPT/ CONNECT | | 2 | X | X | C | X | X | X | X | X | X | X | 0 | 0 | 0 | 1 | 0 | 0 | 0 | 0 | 0 | 0 |
| READ 2 WORDS | Y | 2 | X | X | C | X | X | X | X | X | X | X | 0 | 0 | 0 | 1 | 0 | 0 | 0 | 0 | 0 | 0 |
| READ 4 WORDS | Y | 2 | X | C | C | X | X | X | X | X | X | X | 0 | 0 | 1 | 1 | 0 | 0 | 0 | 0 | 0 | 0 |
| READ 6 WORDS | Y | 2 | C | C | C | X | X | X | X | X | X | X | 0 | 1 | 1 | 1 | 0 | 0 | 0 | 0 | 0 | 0 |
| READ 8 WORDS | Y | 2 | C | C | C | X | X | X | X | X | X | X | 1 | 1 | 1 | 1 | 0 | 0 | 0 | 0 | 0 | 0 |
| READ 2 WORDS, LOCK | Y | 2 | X | X | C | X | X | X | X | X | X | X | 0 | 0 | 0 | 1 | 0 | 0 | 0 | 0 | 0 | 0 |
| READ 2 WORDS, CLEAR 1 WORD | Y | 2 | X | X | C | X | X | X | X | X | X | X | 0 | 0 | 0 | 1 | 0 | 0 | 0 | 0 | 0 | 0 |
| READ 2 WORDS, CLEAR 2 WORDS | Y | 2 | X | X | C | X | X | X | X | X | X | X | 0 | 0 | 0 | 1 | 0 | 0 | 0 | 0 | 0 | 0 |
| READ 1 WORD | Y | 2 | X | X | C | X | X | X | X | X | X | X | 0 | 0 | 0 | 1 | 0 | 0 | 0 | 0 | 0 | 0 |
| READ MEMORY STATUS | Y | 2 | X | X | C | X | X | X | X | X | X | X | 0 | 0 | 0 | 1 | 0 | 0 | 0 | 0 | 0 | 0 |
| READ MEMORY ID | Y | 2 | X | X | C | X | X | X | X | X | X | X | 0 | 0 | 0 | 1 | 0 | 0 | 0 | 0 | 0 | 0 |
| WRITE 1 WORD ZONED | Y | 1 | X | X | C | X | X | X | X | X | X | X | 0 | 0 | 0 | 1 | 0 | 0 | 0 | 0 | 0 | 0 |
| WRITE 1 WORD ZONED, HONOR LOCK | Y | 1 | X | X | C | X | X | X | X | X | X | X | 0 | 0 | 0 | 1 | 0 | 0 | 0 | 0 | 0 | 0 |

NOTES:
(1) BIT 3 IS MEMORY BUS XFER T TIME.
(2) ALL "C" COMPARE BITS MUST BE ZERO. ALL "X" COMPARE BITS ARE DON'T CARE.
(3) Y = YES

TABLE 3

ACTIVITY CYCLE SHIFT REGISTER LOAD

| COMMAND | LOAD BITS 9 | 8 | 7 | 6 | 5 | 4 | 3 | 2 | 1 | MEM CYC |
|---|---|---|---|---|---|---|---|---|---|---|
| READ GENERAL REGISTER | 0 | 0 | 0 | 1 | 1 | 1 | 1 | 1 | 1 | |
| READ INTERRUPT/CONNECT MASK | 0 | 0 | 0 | 1 | 1 | 1 | 1 | 1 | 1 | |
| READ 2 CONNECT WORDS | 0 | 0 | 0 | 1 | 1 | 1 | 1 | 1 | 1 | |
| READ 2 INTERRUPT WORDS | 0 | 0 | 0 | 1 | 1 | 1 | 1 | 1 | 1 | |
| ACCEPT INTERRUPT/CONNECT | 0 | 0 | 0 | 1 | 1 | 1 | 1 | 1 | 1 | |
| READ 1 WORD | 0 | 0 | 0 | 1 | 1 | 1 | 1 | 1 | 1 | Y |
| READ 2 WORDS | 0 | 0 | 0 | 1 | 1 | 1 | 1 | 1 | 1 | Y |
| READ 4 WORDS | 0 | 0 | 1 | 1 | 1 | 1 | 1 | 1 | 1 | Y |
| READ 6 WORDS | 0 | 1 | 1 | 1 | 1 | 1 | 1 | 1 | 1 | Y |

TABLE 3-continued

| COMMAND | ACTIVITY CYCLE SHIFT REGISTER LOAD | | | | | | | | | MEM CYC |
|---|---|---|---|---|---|---|---|---|---|---|
| | LOAD BITS | | | | | | | | | |
| | 9 | 8 | 7 | 6 | 5 | 4 | 3 | 2 | 1 | |
| READ 8 WORDS | 1 | 1 | 1 | 1 | 1 | 1 | 1 | 1 | 1 | Y |
| READ 2 WORDS, LOCK | 0 | 0 | 0 | 1 | 1 | 1 | 1 | 1 | 1 | Y |
| READ 2 WORDS, CLEAR 1 | 0 | 0 | 0 | 1 | 1 | 1 | 1 | 1 | 1 | Y |
| READ 2 WORDS, CLEAR 2 | 0 | 0 | 0 | 1 | 1 | 1 | 1 | 1 | 1 | Y |
| READ MEMORY STATUS | 0 | 0 | 0 | 1 | 1 | 1 | 1 | 1 | 1 | Y |
| READ MEMORY ID | 0 | 0 | 0 | 1 | 1 | 1 | 1 | 1 | 1 | Y |
| WRITE GENERAL REGISTER | 0 | 0 | 0 | 0 | 0 | 1 | 1 | 1 | 1 | |
| WRITE INTERRUPT/CONNECT MASK | 0 | 0 | 0 | 0 | 0 | 1 | 1 | 1 | 1 | |
| WRITE 2 CONNECT WORDS | 0 | 0 | 0 | 0 | 0 | 1 | 1 | 1 | 1 | |
| WRITE 2 INTERRUPT WORDS | 0 | 0 | 0 | 0 | 0 | 1 | 1 | 1 | 1 | |
| WRITE 2 WORDS | 0 | 0 | 0 | 0 | 0 | 1 | 1 | 1 | 1 | Y |
| WRITE 4 WORDS | 0 | 0 | 0 | 0 | 0 | 1 | 1 | 1 | 1 | Y |
| WRITE 6 WORDS | 0 | 0 | 0 | 0 | 0 | 1 | 1 | 1 | 1 | Y |
| WRITE 8 WORDS | 0 | 0 | 0 | 0 | 1 | 1 | 1 | 1 | 1 | Y |
| WRITE 1 WORD ZONED | 0 | 0 | 0 | 1 | 1 | 1 | 1 | 1 | 1 | Y |
| WRITE 1 WORD ZONED, HONOR LOCK | 0 | 0 | 0 | 1 | 1 | 1 | 1 | 1 | 1 | Y |
| WRITE MEMORY STATUS | 0 | 0 | 0 | 0 | 0 | 1 | 1 | 1 | 1 | Y |
| WRITE MEMORY ID | 0 | 0 | 0 | 0 | 0 | 1 | 1 | 1 | 1 | Y |
| CLEAR ASSOCIATIVE MEMORY | 0 | 0 | 0 | 0 | 0 | 1 | 1 | 1 | 1 | |

NOTES:
(1) Y = YES

TABLE 4

ACTIVITY SHIFT REGISTER CONTROL SCENARIO

| DATA-IN SR BITS 10 9 8 7 6 5 4 3 2 1 | DATA-OUT SR BITS 10 9 8 7 6 5 4 3 2 1 | CYCLE SR BITS 9 8 7 6 5 4 3 2 1 | | |
|---|---|---|---|---|
| 0 0 0 0 0 0 0 0 0 0 | 0 0 0 0 0 0 0 0 0 0 | 0 0 0 0 0 0 0 0 0 | ACT 1 | |
| 0 0 0 0 0 0 0 0 0 0 | 0 0 0 0 0 0 0 0 0 0 | 0 0 0 0 0 0 0 0 0 | ACT 2 | T0 TIME |
| 0 0 0 0 0 0 0 0 0 0 | 0 0 0 0 0 0 0 0 0 0 | 0 0 0 0 0 0 0 0 0 | ACT 3 | |
| 0 0 0 0 0 0 0 0 0 0 | 0 0 0 0 0 0 0 0 0 0 | 0 0 0 0 0 0 0 0 0 | ACT 4 | |
| 0 0 0 0 0 0 0 0 0 0 | 0 0 0 0 0 0 0 0 0 0 | 0 0 0 0 0 0 0 0 0 | ACT 5 | |
| 0 0 0 0 0 0 0 0 0 0 | 0 0 0 0 0 0 0 0 0 0 | | OR'D RESULTS | |
| 0 1 1 1 1 0 0 0 0 0 | 0 0 0 0 0 0 0 0 0 0 | 0 0 0 0 1 1 1 1 1 | ACT 1 | |
| 0 0 0 0 0 0 0 0 0 0 | 0 0 0 0 0 0 0 0 0 0 | 0 0 0 0 0 0 0 0 0 | 2 | T1 TIME |
| 0 0 0 0 0 0 0 0 0 0 | 0 0 0 0 0 0 0 0 0 0 | 0 0 0 0 0 0 0 0 0 | 3 | WRITE |
| 0 0 0 0 0 0 0 0 0 0 | 0 0 0 0 0 0 0 0 0 0 | 0 0 0 0 0 0 0 0 0 | 4 | 8W |
| 0 0 0 0 0 0 0 0 0 0 | 0 0 0 0 0 0 0 0 0 0 | 0 0 0 0 0 0 0 0 0 | 5 | |
| 0 1 1 1 1 0 0 0 0 0 | 0 0 0 0 0 0 0 0 0 0 | | OR'D RESULTS | |
| 0 0 1 1 1 1 0 0 0 0 | 0 0 0 0 0 0 0 0 0 0 | 0 0 0 0 0 1 1 1 1 | ACT 1 | |
| 1 0 0 0 0 0 0 0 0 0 | 0 0 0 1 0 0 0 0 0 0 | 0 0 0 1 1 1 1 1 1 | ACT 2 | T2 TIME |
| 0 0 0 0 0 0 0 0 0 0 | 0 0 0 0 0 0 0 0 0 0 | 0 0 0 0 0 0 0 0 0 | ACT 3 | WRITE |
| 0 0 0 0 0 0 0 0 0 0 | 0 0 0 0 0 0 0 0 0 0 | 0 0 0 0 0 0 0 0 0 | ACT 4 | 1W |
| 0 0 0 0 0 0 0 0 0 0 | 0 0 0 0 0 0 0 0 0 0 | 0 0 0 0 0 0 0 0 0 | ACT 5 | |
| 1 0 1 1 1 1 0 0 0 0 | 0 0 0 1 0 0 0 0 0 0 | | OR'D RESULTS | |
| 0 0 0 1 1 1 1 0 0 0 | 0 0 0 0 0 0 0 0 0 0 | 0 0 0 0 0 0 1 1 1 | ACT 1 | |
| 0 1 0 0 0 0 0 0 0 0 | 0 0 0 0 1 0 0 0 0 0 | 0 0 0 0 1 1 1 1 1 | ACT 2 | T3 TIME |
| 0 0 0 0 0 0 0 0 0 0 | 1 1 1 1 0 0 0 0 0 0 | 1 1 1 1 1 1 1 1 1 | ACT 3 | WRITE |
| 0 0 0 0 0 0 0 0 0 0 | 0 0 0 0 0 0 0 0 0 0 | 0 0 0 0 0 0 0 0 0 | ACT 4 | 8W |
| 0 0 0 0 0 0 0 0 0 0 | 0 0 0 0 0 0 0 0 0 0 | 0 0 0 0 0 0 0 0 0 | ACT 5 | |
| 0 1 0 1 1 1 1 0 0 0 | 1 1 1 1 1 0 0 0 0 0 | | OR'D RESULTS | |
| 0 0 0 0 1 1 1 1 0 0 | 0 0 0 0 0 0 0 0 0 0 | 0 0 0 0 0 0 0 1 1 | ACT 1 | |
| 0 0 1 0 0 0 0 0 0 0 | 0 0 0 0 0 1 0 0 0 0 | 0 0 0 0 1 1 1 1 1 | ACT 2 | T4 TIME |
| 0 0 0 0 0 0 0 0 0 0 | 0 1 1 1 1 0 0 0 0 0 | 0 1 1 1 1 1 1 1 1 | ACT 3 | NOP |
| 0 0 0 0 0 0 0 0 0 0 | 0 0 0 0 0 0 0 0 0 0 | 0 0 0 0 0 0 0 0 0 | ACT 4 | |
| 0 0 0 0 0 0 0 0 0 0 | 0 0 0 0 0 0 0 0 0 0 | 0 0 0 0 0 0 0 0 0 | ACT 5 | |
| 0 0 1 0 1 1 1 1 0 0 | 0 1 1 1 1 1 0 0 0 0 | | OR'D RESULTS | |
| 0 0 0 0 0 1 1 1 1 0 | 0 0 0 0 0 0 0 0 0 0 | 0 0 0 0 0 0 0 0 1 | ACT 1 | |
| 0 0 0 1 0 0 0 0 0 0 | 0 0 0 0 0 0 1 0 0 0 | 0 0 0 0 0 0 1 1 1 | 2 | T5 TIME |
| 0 0 0 0 0 0 0 0 0 0 | 0 0 1 1 1 1 0 0 0 0 | 0 0 1 1 1 1 1 1 1 | 3 | WRITE |
| 0 0 0 0 1 0 0 0 0 0 | 0 0 0 0 0 0 0 0 0 0 | 0 0 0 0 0 1 1 1 1 | 4 | 2W |
| 0 0 0 0 0 0 0 0 0 0 | 0 0 0 0 0 0 0 0 0 0 | 0 0 0 0 0 0 0 0 0 | 5 | |
| 0 0 0 1 1 1 1 1 1 0 | 0 0 1 1 1 1 1 0 0 0 | | OR'D RESULTS | |
| 0 0 0 0 0 0 1 1 1 1 | 0 0 0 0 0 0 0 0 0 0 | 0 0 0 0 0 0 0 0 0 | ACT 1 | |
| 0 0 0 0 1 0 0 0 0 0 | 0 0 0 0 0 0 0 1 0 0 | 0 0 0 0 0 0 0 1 1 | 2 | T6 TIME |
| 0 0 0 0 0 0 0 0 0 0 | 0 0 0 1 1 1 1 0 0 0 | 0 0 0 1 1 1 1 1 1 | 3 | NOP |
| 0 0 0 0 0 1 0 0 0 0 | 0 0 0 0 0 0 0 0 0 0 | 0 0 0 0 0 0 1 1 1 | 4 | |
| 0 0 0 0 0 0 0 0 0 0 | 0 0 0 0 0 0 0 0 0 0 | 0 0 0 0 0 0 0 0 0 | 5 | |
| 0 0 0 0 1 1 1 1 1 1 | 0 0 0 1 1 1 1 1 0 0 | | OR'D RESULTS | |

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A synchronous data processing system comprising:
   memory subsystem means including a plurality of memory units for executing memory operations;
   input/out unit means (I/OU) for writing data into the memory subsystem and for reading data out of the memory subsystem;
   central processor unit means (CPU) for writing data into and reading data out of the memory subsystem;
   system controller unit means (SCU) having "n" ports, where "n" is an integer greater than one, a CPU means being operationally connected to one port, and an I/OU means being operationally connected to another;
   a source of clock signals defining clock periods supplying such signals to the SCU;
   said SCU means being operationally connected to the memory subsystem means for controlling access to the memory subsystem means by unit means connected to its ports in response to access request signal sets produced by said unit means; said SCU means including activity register means for concurrently controlling the execution of a maximum "p" SCU activities by the SCU means, where "p" is an integer greater than one, said SCU means and memory subsystem means having resources utilized in the execution of SCU activities by the SCU means, said SCU means also including activity register load control means for producing signals identifying the number of clock periods required to execute each SCU activity accepted for execution by the SCU means and signals identifying the resources of the SCU means and the memory subsystem means required for each clock period an SCU activity is in execution by the SCU means, circuit means for loading said signals into said activity register means; said SCU including circuit means utilizing potential conflicts between requests for an SCU activity and SCU activities in execution during each clock period; said SCU means not accepting a request for an SCU activity if there is such a potential conflict or if there are p SCU activities in execution by the SCU means at the same time.

2. The synchronous data processing system as set forth in claim 1 in which "n" equals eight.

3. The synchronous data processing system as set forth in claim 2 in which "p" equals five.

4. In a synchronous data processing system in which commands and activities are executed in a series of one or more steps with each step occurring during a clock period, said system including a memory subsystem means including a plurality of memory units for executing memory operations, a system controller unit means, (SCU), at least one central processing unit means, (CPU), and an output unit means, (I/OU); said SCU having "n" ports, where "n" is an integer greater than one and a plurality of addressable registers; a CPU and an I/OU means being operationally connected to ports of the SCU, and the SCU being operatively connected to the memory subsystem; the SCU controlling access to the addressable registers of the SCU and to the memory subsystem in response to access request signal sets produced by the units operatively connected to the ports of the SCU, the request signal sets produced by each such unit including a command portion, there being at most only one unit connected to one port of the SCU; the improvements comprising:
   port request control means associated with each port of the SCU for receiving the command portion of each access request signal set applied to its associated port by a unit operationally connected thereto and for producing port request control signals;
   activity priority select control means to which the port request control signals produced by the port request control means of the ports are applied for producing activity select signals and port select signals;
   activity register means to which the activity select signals and port select signals produced by the activity priority select control means are applied for concurrently controlling the execution of a maximum "p" SCU activities, where "p" is an integer greater than 1, and an SCU activity is defined as operations of the SCU and memory subsystems requested to execute the command portion of an access request signal set applied to a port; the activity register means including p cycle shift registers, p data-in shift registers, and p data-out shift registers, each of the shift registers shifting its contents one position each clock period, there being a cycle shift register, a data-in shift register, and a data-out shift register for each one of the p SCU activities; activity register load control circuit means to which the port select signals produced by the activity priority select control means and the command portion of a given access request signal set of a selected port are applied for loading activity control binary logic signals having a given logic value into predetermined bit positions of the three shift registers of the selected SCU activity, the SCU activity selected being determined by the activity register select signal produced by the activity priority select control means and applied to the shift registers of the selected SCU activity, the bit positions of the SCU activity shift registers into which the activity control binary logic signals are initially loaded being determined by the command portion of the access request signal set applied to the activity register load control means, the bit positions of the data-in and data-out registers for a given SCU activity corresponding to the location of data in the SCU and the memory subsystem during each clock period during which each SCU activity is in execution, the number and bit positions of the cycle register into which logic signals of said given value are loaded being a function of the number of clock periods required to executed the SCU activity; and
   said port request control means including circuit means for comparing the state of logic signals stored in selected bit positions of the data-in and data-out shift registers of all the SCU activities in execution by the SCU during a given clock period with the activity binary logic signals of the command portion of an access request signal set awaiting execution by the SCU and for producing signals enabling the activity priority select control means to produce signals enabling the activity register load control means to load the activity binary logic signal for a given command into the SCU activity shift registers if available to begin the execution of an SCU activity during the next clock period.

5. In a synchronous data processing system as set forth in claim 4 in which "n" equals eight.

6. In a synchronous data processing system as set forth in claim 5 in which "p" equals five.

* * * * *